April 21, 1931.   W. R. RICE   1,802,272
ANIMAL TRAP
Filed Aug. 13, 1930   2 Sheets-Sheet 1
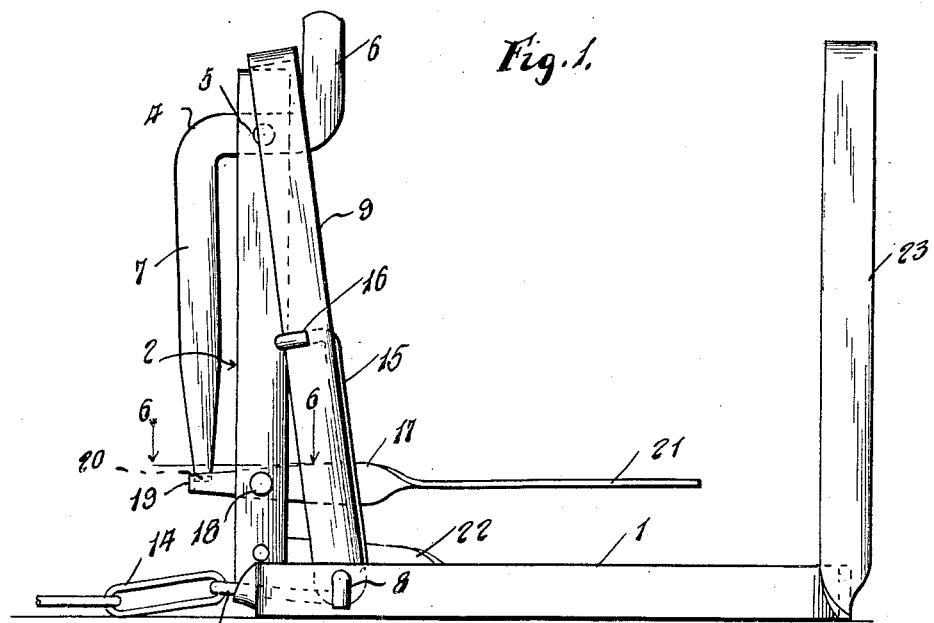
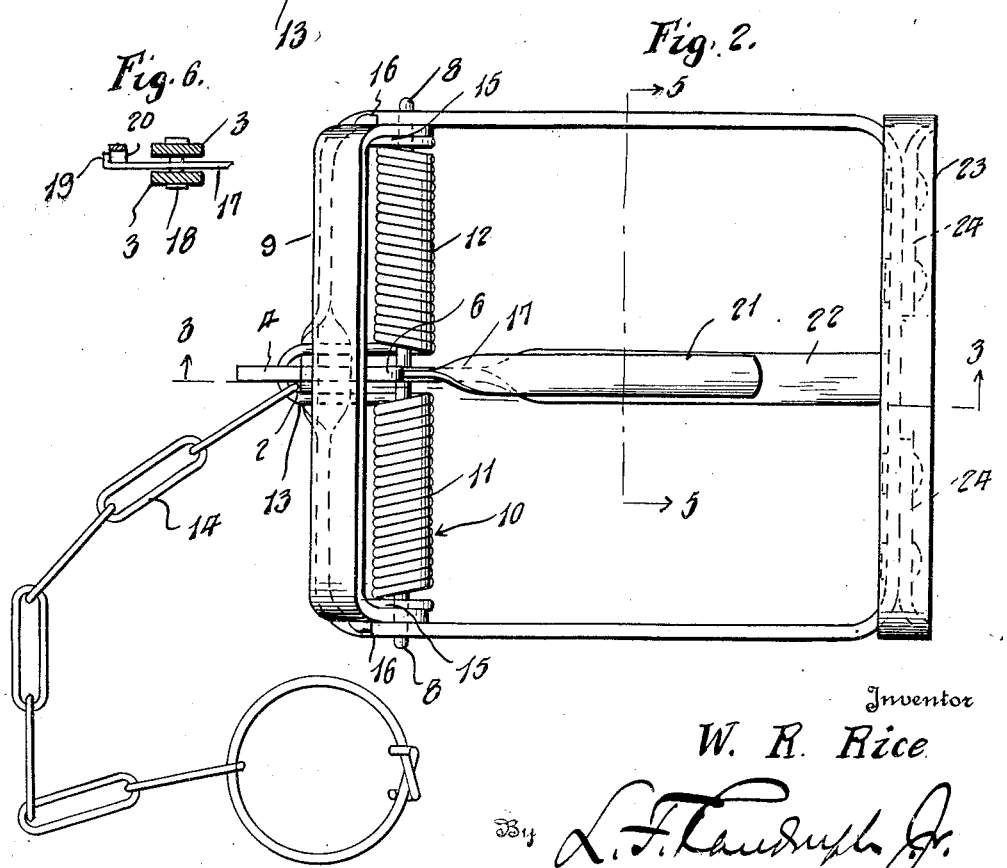
Inventor
W. R. Rice

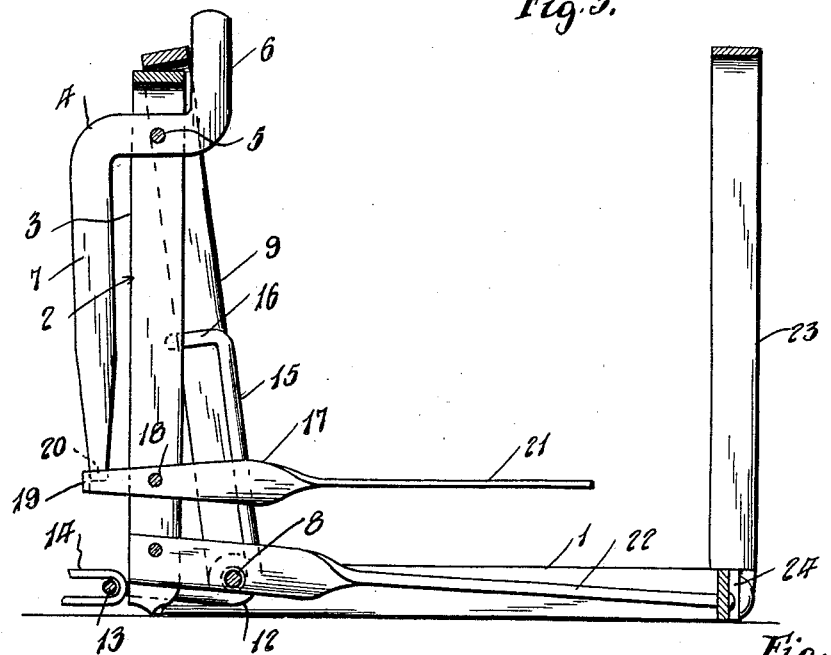
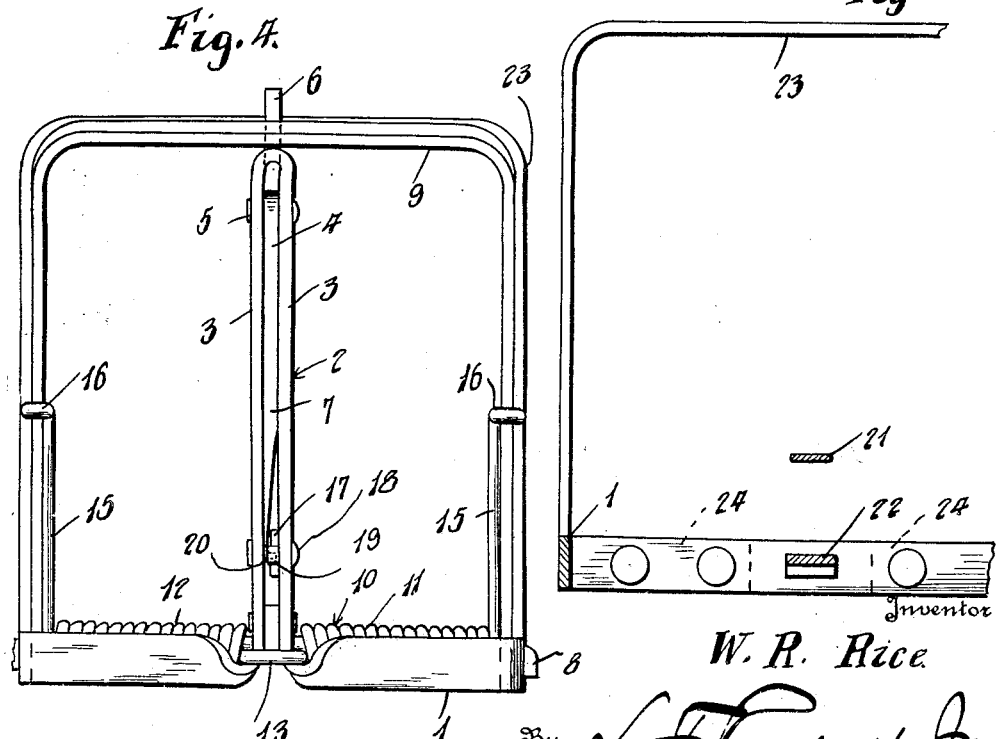

Patented Apr. 21, 1931

1,802,272

UNITED STATES PATENT OFFICE

WILLIS R. RICE, OF ST. ALBANS, VERMONT

ANIMAL TRAP

Application filed August 13, 1930. Serial No. 475,024.

The invention relates to animal traps of the choker type and has for its object the provision of a trap that is reasonable in cost of construction, that is effective in operation, and in which provision is made to guide the animal into the trap and prevent the animal from being thrown clear of the trap when the trapping jaws act.

The invention will be described in detail hereinafter and will be found illustrated in the accompanying drawings in which Figure 1 is side view in elevation of the improved animal trap, Figure 2 is a top plan view, Figure 3 is a longitudinal sectional view on a plane indicated by the line 3—3 of Figure 2, Figure 4 is an end view, Figure 5 is a fragmentary transverse sectional view on a plane indicated by the line 5—5 of Figure 2, Figure 6 is a sectional detail on a plane indicated by the line 6—6 of Figure 1.

In the drawings similar reference characters are used to designate corresponding parts in all the views.

The improved trap has a base member 1 that is, as shown, preferably made of a metal band, preferably steel or iron, and formed into a rectangular shape as shown in Figure 2. At one end of the trap the band of metal comprising the base 1 is bent upwardly to provide a U-shaped post 2 having spaced members 3, between which is pivotally mounted an angular latch 4 as shown at 5, said latch having an upright member 6, and a downturned member 7. Secured to the base member 1 is a rod 8, and pivotally secured to said rod is a U-shaped jaw member 9 that when in set position is engaged behind the upright member 6, as clearly shown in the figures of the drawings. A spring member 10 is provided, and as shown, is mounted on the rod 8, said spring member comprising a single length of material and having two coils 11 and 12 twisted in opposite directions as shown and connected by a U-shaped loop member 13 that is engaged around the U-shaped post 2, and providing a connecting means for an anchor chain or other flexible anchor member 14. The extremities of the spring member 10 are extended as shown at 15 and provided with hooks 16 that engage the sides of the U-shaped jaw member 9 and normally tend to close the jaw when released from engagement by the latch member 4. 17 indicates a trigger member pivotally secured as shown at 18 between the plates 3 of the post 2. The trigger member 17 is provided with a laterally extending flange 19 that is adapted to engage a lateral flange 20 on the lower end of the arm 7 when the trap is in set position and the upright member 6 of the latch 4 is engaging the U-shaped jaw member 9 as heretofore described. The other end of the trigger 17 provides a pan 21 that may be utilized to hold the bait to lure the animal, or in any event to be engaged by the animal to spring the trap. 22 indicates a brace member secured at one of its ends between the spaced sides 3 of the upright post 2, and secured at its other end to the frame 1 opposite to the post 2.

23 indicates an upright U-shaped baffle member having its ends inturned as shown at 24 and secured to the end of the frame 1 remote from the post 2. The purpose of the baffle member 23 is to prevent the trapped animal from being thrown clear of the trap when the trap is sprung. It also answers as a guide being arranged opposite to the jaw 9 when in set position, and when the trap is arranged in a trail that is ordinarily followed by the animal to be trapped the baffle member 23 and the jaw 9 in set position operates to direct the animal between the jaw 9 and the baffle 23 so as to insure that the animal crosses the trap in following its usual trail.

What is claimed is:—

1. A trap comprising a base frame, an inverted U-shaped post on said frame, a latch member and a trigger pivotally secured to said post, a rod secured to said frame, a U-shaped jaw pivotally secured to said rod and engageable by said latch, and spring means mounted on said rod and secured to said jaw and normally tending to close the jaw on the base frame, said trigger being engageable with the latch to hold the jaw engaged therewith.

2. A trap, comprising a base frame made of a continuous metal bar, said frame being formed with an integral upright post having spaced sides, a latch member pivoted between said spaced sides, a trigger member pivoted between said spaced sides and having a lateral flange engageable with said latch, a rod secured to said frame, a U-shaped jaw pivotally secured to said rod and engageable by said latch, a spring member mounted on said shaft, said spring member comprising a single strand of material having its ends engaging said jaw and provided with coils around the shaft, and the material between the coils looped around the post and adapted to be secured to an anchor member.

3. A trap, comprising a base frame consisting of a continuous metal bar bent to provide an open frame, a post integral with the frame and having spaced side members, a latch member and a trigger pivoted between said side members, said trigger provided with a lateral flange, a flange on the latch member engaging the flange on the trigger, a rod secured to the frame, a U-shaped jaw pivoted on said rod and engageable by said trigger member, a spring member mounted on said rod and engaging said jaw to close it, said spring member consisting of spaced coils formed of a single strand of material and having a U-shaped extension engaging the base frame and providing a loop for engagement by an anchor member.

In testimony whereof I affix my signature.

WILLIS R. RICE.